United States Patent [19]
Hwang

[11] Patent Number: 5,774,483
[45] Date of Patent: Jun. 30, 1998

[54] METHOD AND APPARATUS FOR RECOVERING AN IMAGE IN A VIDEO TELEPHONE SYSTEM

[75] Inventor: Jae-Sik Hwang, Seoul, Rep. of Korea

[73] Assignee: SamSung Electronics Co., Ltd., Suwon, Rep. of Korea

[21] Appl. No.: 252,000

[22] Filed: May 31, 1994

[30] Foreign Application Priority Data

May 31, 1993 [KR] Rep. of Korea ..................... 9524/1993

[51] Int. Cl.⁶ ....................................................... H04L 1/16
[52] U.S. Cl. .......................... 371/62; 371/37.02; 371/57.2
[58] Field of Search ................................. 371/31, 32, 33, 371/35, 37.1, 57.2, 62, 37.02

[56] References Cited

U.S. PATENT DOCUMENTS

| | | | |
|---|---|---|---|
| 4,703,350 | 10/1987 | Hinman | 358/133 |
| 4,827,339 | 5/1989 | Wada et al. | 358/136 |
| 5,027,356 | 6/1991 | Nakamura et al. | 371/32 |
| 5,117,288 | 5/1992 | Eisenhardt et al. | 358/136 |
| 5,150,209 | 9/1992 | Baker et al. | 358/133 |
| 5,150,210 | 9/1992 | Hoshi et al. | 358/135 |
| 5,231,492 | 7/1993 | Dangi et al. | 358/143 |

*Primary Examiner*—Stephen M. Baker
*Attorney, Agent, or Firm*—Robert E. Bushnell, Esq.

[57] ABSTRACT

An image recovery method and apparatus in a video telephone system includes an image compression coding device for coding an analog image signal and for decoding image data received in dependence upon control signals indicative of a mode signal and a frame operator signal; a transmitting/receiving entropy coder/decoder device for compressing, coding and outputting entropy coded data from the image data provided from the image compression coding device, and for decoding, expanding and providing entropy decoded data to the image compression coding device; a network interface device for multiplexing control data and entropy encoded data provided from the transmitting/receiving entropy part to output multiplexed image data to a transmission line, and for de-multiplexing multiplexed data received from the transmission line to provide demultiplexed image data to the transmitting/receiving entropy part and simultaneously extract the control data from the multiplexed data; a controller connected to the network interface device, for controlling the transmission and reception of image data of the network interface device, for supplying a BAS code signal indicative of protocol data requesting an image recovery from a broken image to the network interface part in response to a fast up-date request signal and for outputting a fast up-date request acknowledge signal in response to the control data provided from the network interface device; and a data error detector for providing the fast up-data request signal to the controller in dependence upon a comparison of a length of entropy decoded data and a length of standard data via header codes, and for setting a mode operation of the image compression coding device to an intraframe mode in response to the fast up-date request acknowledge signal provided from the controller.

25 Claims, 3 Drawing Sheets

METHOD AND APPARATUS FOR RECOVERING AN IMAGE IN A VIDEO TELEPHONE SYSTEM

CROSS-REFERENCE TO RELATED APPLICATIONS

This application makes reference to, incorporates the same herein, and claims all benefits incurring under 35 U.S.C. §119 from an application for "*Method And Apparatus For Recovering An Image In A Video Telephone System*" filed in the Korean Industrial Property Office on 31 May 1993 and assigned Ser. No. 1993/9524.

BACKGROUND OF THE INVENTION

1. Technical Field

The present invention relates to a method and apparatus for transmitting and receiving image data in a video telephone system, and more particularly, to a data transmitting and receiving apparatus and method for detecting errors representative of a broken image of the image data transmitted and received in a motion video telephone system and for enabling an automatic image recovery if errors are detected.

2. Background Art

In recent years, there has been a rapid advance in multiplex communication systems transmitting both audio data and image data, such as with video conferences and motion video telephone systems. In such audio and image multiplex communication systems, it is extremely important to perform the coding and decoding of the audio data and image data at a high efficiency and to maintain a balance between the audio data and the image data in view of their different coding speeds. Various image coding schemes used in such audio and image multiplex communication systems have been proposed such as motion compensation interframe predictive coding as disclosed in U.S. Pat. No. 4,703,350 issued to Hinman for "*Method And Apparatus For Efficiently Communicating Image Sequences*" and U.S. Pat. No. 5,150,209 issued to Baker et al. for "*Hierarchical Entropy Coded Lattice Threshold Quantization Encoding Method And Apparatus For Image And Video Compression,*" which endeavor to reliably transmit and receive an accurate estimate of displacement errors in a scanned image between frames, while others such as disclosed in U.S. Pat. No. 5,231,492 issued to Dangi et al. for "*Video and Audio Multiplex Transmission System*" which proceeds to balance the audio data and image data in a limited transmission channel by changing the content of data transmission to correct a difference between the processing speed of the audio data and the image data in order to enhance the quality of image resolution. These image coding schemes however provide no antidote to the problems associated with unforeseeable burst errors in a transmission network, or random errors which lead to a breaking phenomenon of a received image.

If such unforeseeable burst errors or random errors occur in a received image, one obvious solution is to resort to error control systems which are capable of retransmitting information signals in real time. One example of such error control systems is disclosed in U.S. Pat. No. 5,027,356 issued to Nakamura et al. for "*Error Control System.*" The drawback of these error control systems is that there will be some delay in the transmission of image signals.

Another example of such error control system is disclosed in U.S. Pat. No. 4,827,339 issued to Wada et al. for "*Moving Picture Signal Transmission System*" which endeavors to isolate transmission errors within a single picture frame by switching the encoding operation from an interframe mode to an intraframe mode when errors are detected in the transmission frames. In Wada et al. '339, the transmission mode is controlled by checking the validity of the identification header of a received transmission frame with a receiver after a transmitter divides one picture frame into a plurality of fixed frame-length transmission frames having different headers in order to respectively identify first, middle and last transmission frames respectively and transmits the plurality of fixed frame-length transmission frames successively across a communication channel. The drawback of this error control system is that a single picture frame must be divided into a plurality of fixed frame-length transmission frames with different headers for identification; and thus, errors can only be detected if the contents of the headers do not agree with a header pattern stored in a read-only-memory.

A more pertinent conventional audio and image multiplex transmission system of a motion video telephone operates under a coding and decoding algorithm system as recommended by CCITT recommendation H.261. I have discovered that such an image recovery technique, which corrects the errors of the reception image signal and recovers the image in accordance with recommendation H.261, is slow in speed because it takes time for the user to monitor the visual display of an image breakage and then operate a manually operated recovery request key installed on a keypad of the video telephone in order to recover the broken image. In addition, whenever a received image is broken, there is always some dissatisfaction associated with the image recovery method of the conventional video telephone in that the user must manually operate the recovery request key.

SUMMARY OF THE INVENTION

It is therefore, an object of the present invention to provide an improved process and apparatus for detecting error status of a motion image.

It is another object to provide a process and apparatus for detecting error status of a motion image received and for making an automatic recovery of image data in an image communication system.

It is yet another object to provide an apparatus for detecting error status of image data transmitted and received and automatically making an image recovery without the use of a manually operated recovery request key.

These and other objects may be achieved with a process and system for image recovery in a video telephone system constructed according to the principles of the present invention. An image recovery apparatus as contemplated by the present invention includes an image compression coding device for coding an analog image signal and for decoding image data received in dependence upon control signals indicative of a mode signal and a frame operator signal; a transmitting/receiving entropy part for compressing, coding and outputting entropy coded data from the image data provided from the image compression coding device, and for decoding, expanding and providing entropy decoded data to the image compression coding device; a network interface part for multiplexing control data and entropy encoded data provided from the transmitting/receiving entropy part to output multiplexed image data to a transmission line, and for de-multiplexing the multiplexed image data received from the transmission line to provide demultiplexed image data to the transmitting/receiving entropy part and simultaneously extract the control data from the multiplexed image data; a controller connected to the network interface part, for controlling the transmission and reception of image data in the network interface part, supplying a BAS code signal indicative of protocol data requesting an image recovery from a broken image to the network interface part in response to a fast update request signal and for outputting a fast update request acknowledge signal in response to the control data provided from the network interface part; and a data error detector for providing the fast update request signal to the controller by checking whether header code intervals of the entropy decoded data of the transmitting/receiving entropy part are maintained at predetermined time periods, and for setting a transmission mode operation of the image compression coding device to an intraframe mode in response to the fast update request acknowledge signal provided from the controller.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same and similar components, wherein.

DETAILED DESCRIPTION OF THE PREFERRED EMBODIMENT

In the following description, numerous specific details are set forth to provide a more thorough understanding of the present invention. It will be apparent, however, to one skilled in the art, that the present invention may be practiced without these specific details. In other instances well known circuits have not been described so as not to obscure the present invention.

Figure 1:
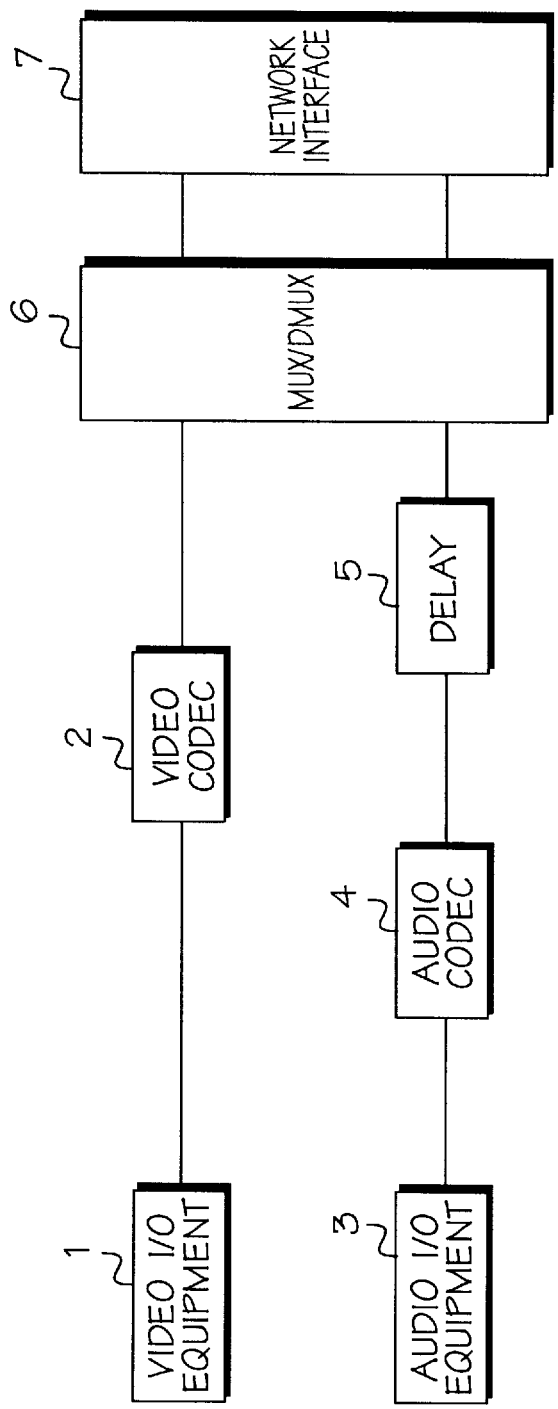
FIG. 1 is a block diagram constructed by the instant inventor to provide an abstract representation of a conventional motion video telephone system.

Referring now to the drawings and particularly to FIG. 1, a pertinent conventional audio and image multiplex transmission system of a motion video telephone is shown. This conventional system operates under a coding and decoding algorithm system as recommended by CCITT recommendation H.261. In the system shown in FIG. 1, the conventional audio and image multiplex transmission system includes a video input/output equipment 1 for converting an analog image signal into a digital image data; a video coder/decoder 2 for coding and decoding the digital image data in accordance with CCITT recommendation H.261; an audio input/output equipment 3 for converting an analog audio signal into digital audio data; an audio coder/decoder 4 for coding and decoding the digital audio data in accordance with CCITT recommendation H.261; a multiplexer/demultiplexer 6 for multiplexing the digital image data and the digital audio data with control data such as a frame alignment signal (hereinafter "FAS data"), a bit allocation signal (hereinafter "BAS code data") in accordance with CCITT recommendation H.221 for subsequent transmission to the motion video telephone of the other party through a network interface 7 regulated by CCITT recommendation I.430, and for demultiplexing image data received from the network interface 7; and a delay 5 disposed between the audio coder/decoder 4 and the multiplexer/demultiplexer 6, for delaying the digital audio data for a time delay corresponding to the delay for coding the digital image data. Image data of the motion video telephone used in accordance with the CCITT recommendation H.261 coding and decoding algorithms is fashioned in accordance with a picture layer, a group of block layer (GOB), a macro block layer (MB) and a block layer of different image formats. In a quarter common intermediate format (Q-CIF) as recommended by CCITT recommendation H.261 consisting of 352 pixels by 288 lines, the picture layer includes three GOB layers, with each GOB layer having thirty-three macro image blocks. Each macro image block is constructed as one unit block and terminates a runlength coding with a corresponding header. Runlength coded data is the transmitted after a Bose-Chaudhuri-Hocquenghem (hereinafter "BCH") coding by a channel coding system of the video coder/decoder 2. In a BCH coding, one frame is composed of 1 frame bit, 493 coded bits and 18 parity bits.

The motion video telephone system for controlling the transmission and reception of a motion image in accordance with the above procedure transmits a first frame of image data in an intraframe mode, and then transmits subsequent frames of image data in an interframe mode. That is, a single frame image is transmitted in an intraframe mode, and then only a motion image indicative of a difference image between a present frame image and a previous frame image is extracted for transmission in the interframe mode. During the transmission and reception of mutual images between the respective motion video telephone of a transmitting party and a receiving party by the above procedure, if there are occurrences of unforeseeable burst errors in a transmission network, such as errors occurring in the transmission line of an integrated service digital network (hereinafter "ISDN"), or considerable random errors, a breaking phenomenon of a received image occurs. Namely, the image displayed on a screen is dispersed. If such a phenomenon occurs, a user must manually make an image recovery request by pressing a recovery request key installed on a keypad connected to the video input/output equipment 1 of the video telephone system. When a fast up-date request signal is generated, the video telephone of the receiving party transmits BAS code data for indicating an error occurrence in the image data. At this time, BAS code data is transmitted to the video telephone system of the transmitting party through the transmission network. The video telephone system of the transmitting party which receives the BAS code data converts a transmission mode from an interframe mode to an intraframe mode in response to reception of a received image data so that the image data may be transmitted in the intraframe mode. When the transmission mode of the video telephone of the transmitting party is converted into the intraframe mode, the broken image of the receiving party is recovered by simply transmitting one complete and isolated frame image.

The foregoing image recovery process suitable for use in a conventional video telephone, which endeavors to correct errors in the reception image signal and to recover a broken reproduced image, is in my opinion, unnecessarily slow in speed because, as I have discovered, it takes time for the user to monitor the visual display of an image breakage and then manipulate a manually operated recovery request key installed on a keypad of the video telephone in order to recover the broken image. In addition, whenever a received image is broken, there is always a disadvantage associated with the image recovery method of the conventional video telephone in that the user must manually operate the recovery request key.

Figure 2:
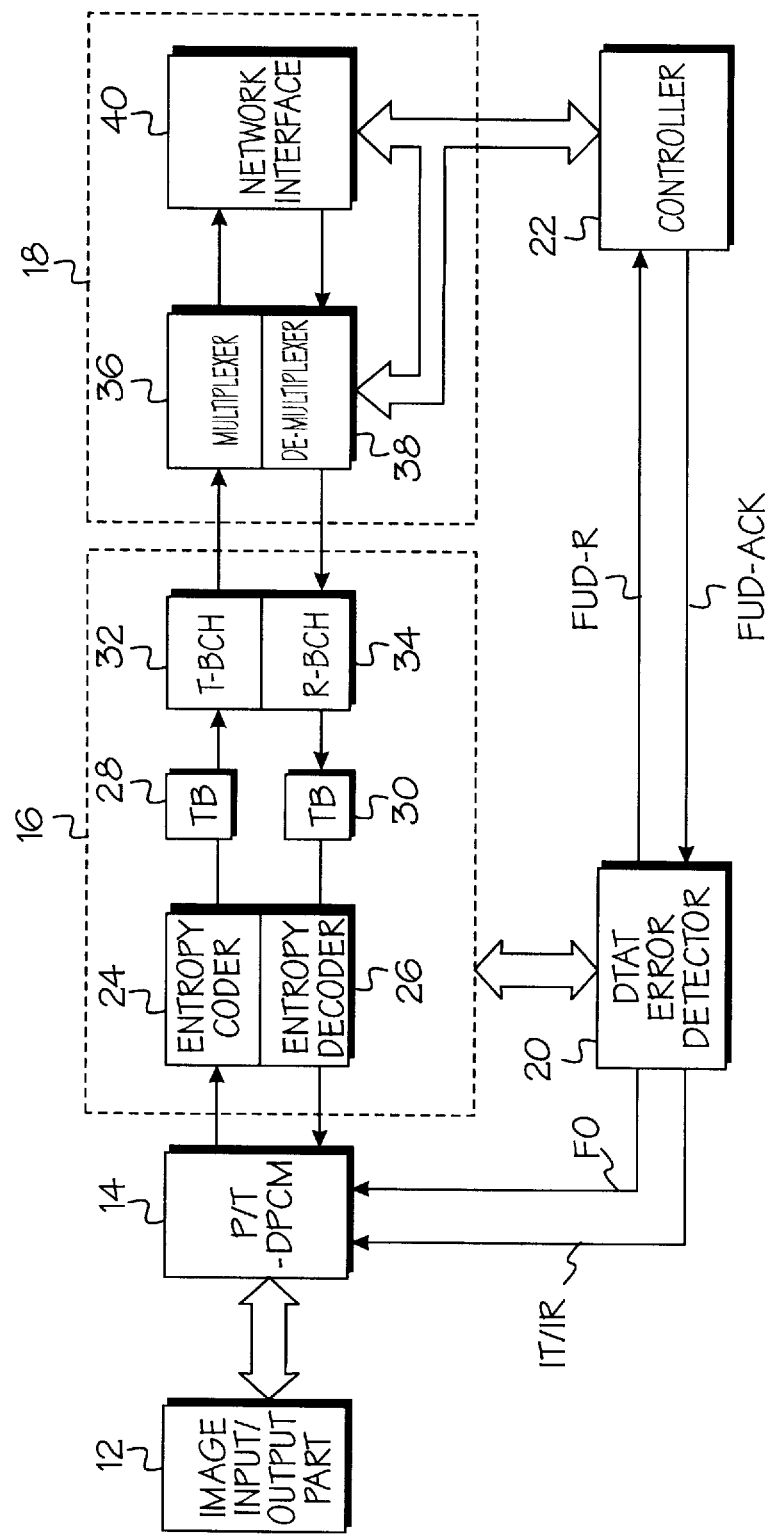
FIG. 2 is a block diagram of a motion video telephone system constructed according to the principles of the present invention.

Turning now to FIG. 2, the motion video telephone system as constructed according to the principles of the present invention includes an image input-output part 12 for inputting and outputting an image signal indicative of an image of an object, and for enabling a visual display of an image based on a received image signal; a differential pulse-code-modulation part (hereinafter "DPCM") 14 for coding the image signal output from the image input-output part 12 and providing pulse-code-modulated data in dependence upon control signals indicative of a mode signal (IT/IR) and a frame operator (FO) signal, and for decoding image data received and outputting pulse-code-demodulated data in a form of an analog image signal to the image input-output part 12; a transmitting/receiving entropy part 16 for compressing, coding and outputting entropy-coded data from the pulse-code-modulated data provided from the DPCM 14, and for decoding, expanding and providing entropy-decoded data to the DPCM 14; a network interface part 18 for multiplexing control data and entropy-encoded data provided from the transmitting/receiving entropy part 16 to output image data to a transmission line, and for de-multiplexing the multiplexed image data received from the transmission line to provide image data to the transmitting/receiving entropy part 16 and simultaneously extract the control data from the multiplexed image data; a controller 22 connected to the network interface part 18, for controlling the transmission and reception of the image data in the network interface part 18, for supplying a BAS code signal indicative of protocol data requesting image recovery from a broken image to the network interface part 18 in response to a fast up-date request signal (hereinafter "FUD-R signal"), and for outputting a fast up-date request acknowledge signal (hereinafter "FUD-ACK signal") in response to the control data provided from the network interface part 18; and a data error detector 20 for providing the FUD-R signal to the controller 22 if a time for checking a length of the entropy-decoded data of the transmitting/receiving entropy part 16 exceeds a length of a standard data frame through a header code value, and for setting a mode operation of the DPCM 14 to an intraframe mode in response to the FUD-ACK signal provided from the controller 22.

The transmitting/receiving entropy part 16 of FIG. 2 comprises an entropy coder 24 for runlength coding and outputting the pulse-code-modulated data provided from the DPCM 14; a transmitting buffer 28 for buffering the runlength-coded data provided from the entropy coder 24; a transmitting BCH coder (hereinafter, referred to as "T-BCH coder") 32 for coding the buffered runlength-coded data provided from the transmitting buffer 28 with a Bose-Chaudhuri-Hocquenghem code (hereinafter "BCH") and outputting BCH coded data; a receiving BCH decoder (hereinafter, referred to as "R-BCH decoder") 34 for BCH decoding and outputting the image data received; a receiving buffer 30 for buffering the BCH decoded data provided from the receiving BCH decoder 34; and an entropy decoder 26 for runlength decoding the buffered BCH decoded data provided from the receiving buffer 30 to output the runlength-decoded data to the DPCM 14.

The network interface part 18 comprises a multiplexer 36 for multiplexing the BCH coded data provided from the T-BCH coder 32 and the control data provided from the controller 22 and providing multiplexed data to a network interface 40; a de-multiplexer 38 for de-multiplexing multiplexed image data received from the network interface 40, for outputting demultiplexed data to the R-BCH decoder 34 and for outputting the control data to the controller 22; and a network interface 40 disposed between the multiplexer 36 and the de-multiplexer 38 and transmission lines, for interfacing with an ISDN network under control of the controller 22.

Figure 3:
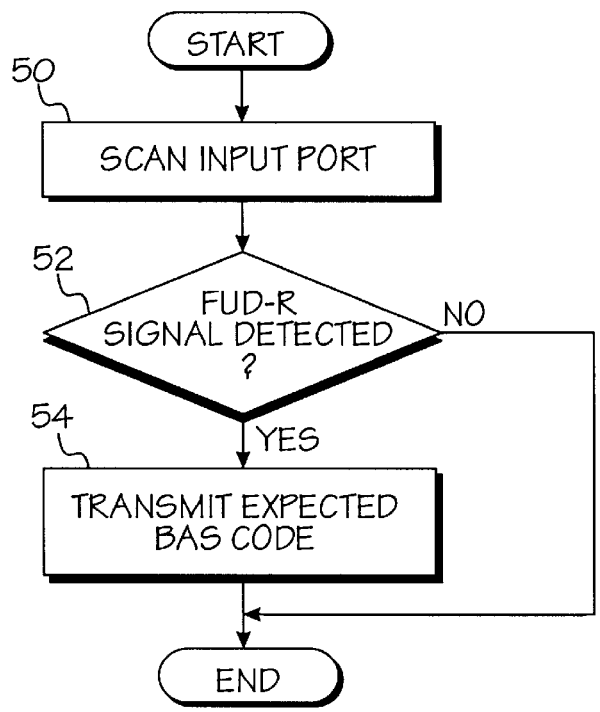
FIG. 3 is a flow chart of an image recovery request process performed according to the principles of the present invention.

FIG. 3 is a flow chart of an image recovery request according to the present invention and illustrates an image recovery request operation of the controller 22 shown in FIG. 2. The flow chart shows a procedure for transmitting a predetermined BAS code data to a transmitting party through the multiplexer 36 in response to the input FUD-R signal upon reception of a broken image by a receiving party. Specifically, the controller 22 of the receiving party periodically scans an input port for a prescribed period in step 50 in order to detect the FUD-R signal provided from the data error detector 20. If the FUD-R signal is detected in step 52, the controller 22 transmits BAS code data indicative of protocol data requesting transmission of the image data by the transmitting party in the intraframe mode to the multiplexer 36 in step 54, for enabling the image data to be transmitted in the intraframe mode. If the FUD-R signal is not detected, at step 52 the controller 22 bypasses the image recovery request operation.

Figure 4:
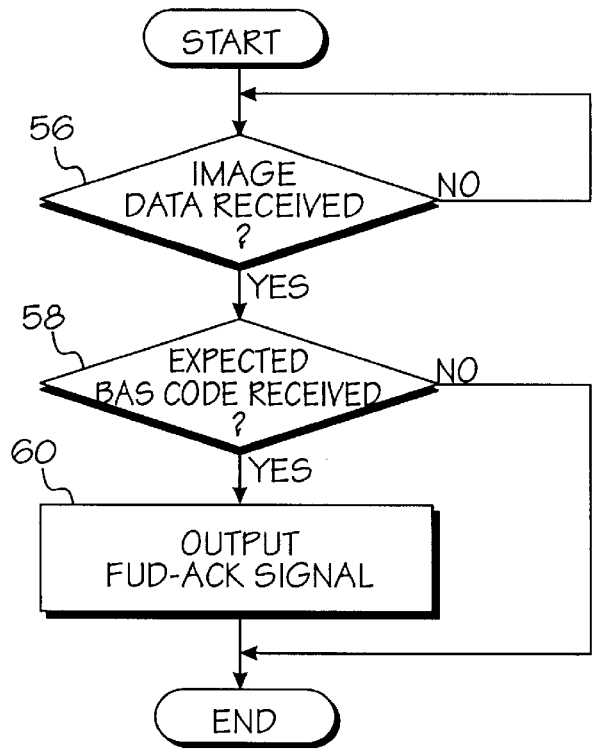
FIG. 4 is a flow chart of an exemplary process for controlling image recovery as performed according to the principles of the present invention.

FIG. 4 is a flow chart for controlling an image recovery according to the present invention and illustrates a mode setting operation of the DPCM 14 of the motion video telephone system of the transmitting party in the intraframe mode through the data error detector 20 in response to reception of the FUD-ACK signal by the controller 22 so that all image data of one frame may be transmitted. Referring now to FIG. 4, the controller 22 of the transmitting party monitors for the image data transmitted by the receiving party at the de-multiplexer 38 in step 56. If the image data transmitted by the receiving party is received by the de-multiplexer 38, the controller 22 detects whether the reception image data received contains the expected BAS code data in step 58 and proceeds to output the FUD-ACK signal in step 60 to the data error detector 20, for enabling generation of an intraframe mode signal to the DPCM 14 DPCM 14 responds to the intraframe mode signal to transmit the image data in the intraframe mode for image recovery. If the BAS code data is not present in the reception image data at step 58, the controller 22 bypasses the mode setting operation.

In FIG. 2, when the analog image signal is provided from the image input-output part 12, it is input to the DPCM 14. The DPCM 14 converts the analog image signal into a digital signal for coding and quantization in order to provide pulse-coded-modulated data to the entropy coder 24 in a specific transmission mode according to the control signals provided from the data error detector 20. The control signals provided from the data error detector 20 comprise a frame operator signal and a mode signal (IT/IR mode) indicative of either an intraframe mode signal or an interframe mode signal. In an initial frame of image data, the frame operator FO signal and the intraframe mode (IT mode) signal are provided by the data error detector 20; and the DPCM 14 operates in an intraframe mode to output all of the pulse-code-modulated data of one frame to the entropy coder 24. The entropy coder 24 executes the runlength coding of the pulse-codemodulated data sequentially and outputs the runlength-coded data to the T-BCH coder 32 via the transmitting buffer 28. The T-BCH coder 32 then BCH-codes the runlength-coded data in accordance with CCITT recommendation H.261 in order to provide the BCH-coded data to the multiplexer 36. The transmitting buffer 28 in the above configuration is used to buffer a difference between the output of the entropy coder 24 and the T-BCH coder 32.

The multiplexer 36 multiplexes the BCH-coded data provided from the T-BCH coder 32 and the control data such as the FAS data and BAS code data provided from the controller 22 in order to provide the multiplexed image data to the network interface 40. As described earlier, the FAS data is a signal used for frame synchronization; and the BAS code data is a bit rate permission signal for data protocol and is coding information used for confirming whether audio and image coding methods in the motion video telephone of the transmitting party and the user are compatible with each other. The BAS code data is also used to set the coding data of the amount of audio information and the amount of the image information at the transmitter side (for example, coding bit rate). The network interface 40 transmits the multiplexed image data provided from the multiplexer 36 to the other party through the transmission line connected to the ISDN network under control of the controller 22.

Meanwhile, the image signal output from the transmitting party is received to the network interface 40 and the network interface 40 inputs the reception image data to the de-multiplexer 38 under the control of the controller 22. The de-multiplexer 38 de-multiplexes the multiplexed image data received from the network interface 40 in order to output the demultiplexed image data and the control data separately. The demultiplexed image data is then supplied to the R-BCH decoder 34, and the control data is supplied to the controller 22. Here, it can be understood that such multiplexing and de-multiplexing operations are performed in a frame format or a similar frame structure as recommended in CCITT recommendation H.221.

The R-BCH decoder 34 which receives the demultiplexed image data provided from the de-multiplexer 38, BCH-decodes the reception image data to output the BCH decoded data to the receiving buffer 30. The R-BCH decoder 34 BCH-decodes the demultiplexed image data in a frame unit transmitted in a 493 bit unit from the transmitting party in order to provide the BCH decoded data in a frame unit to the receiving buffer 30. At this time, if the transmission error in the transmission of the image data by the transmitter is below 2 bits per a 493 bit unit, the R-BCH decoder 34 corrects the data error by parity bits received in the BCH decoding and compensates the frame transmission error. The R-BCH decoder 34 could also be designed to correct errors greater than 2 bits per a 493 bit unit, depending upon the number of parity bits allocated for each frame. The receiving buffer 30 which receives the BCH decoded data provided from the R-BCH 34 buffers the BCH decoded data and provides the buffered BCH decoded data to the entropy decoder 26. The entropy decoder 26 entropy-decodes the buffered BCH decoded data to output the entropy-decoded data to the DPCM 14. The entropy decoding is performed on each macro unit having six image data blocks with each data block consisting of 8 pixels×8 lines and counts the number of image data blocks. The DPCM 14 which receives the entropy decoded data provided from the entropy decoder 26, decodes and converts the entropy decoded data into the analog image signal for subsequent reproduction of an image by the image input-output part 12.

Under the operation as described in FIG. 2, the data error detector 20 connected to the transmitting/receiving entropy part 16, detects the H.261 decoding operation of the transmitting/receiving entropy part 16 for error status in the reception image data. If there is no error in the reception image data, the motion video telephones of the transmitting and receiving parties transmit and receive the motion image mutually in order to effectuate the image and voice communication between the two parties. If unexecuted burst errors or considerable random errors occur on the transmission lines or on the transmitting network however, these errors are of great magnitude and exceed the error correction capability of the R-BCH decoder 34; that is, if there are more than 2 bits of burst errors or random errors per a 493 bit unit of reception data, the burst errors spread to the next frame of reception data, which consequently lead to a dispersement of a reproduced image displayed on a screen. The error data spread in the R-BCH decoder 34 is input to the entropy decoder 26 through the receiving buffer 30, where a runlength decoding operation is executed on each macro unit composed of six image data blocks. The entropy decoder 26 also increases a counter for counting the block number upon every completion of the runlength decoding operation on each image data block. Each image data block is under a spreading state effectuated by the burst errors. Thus, the number of error data of each image data block constantly increases; and the value of the counter for counting image data blocks within each macro block increases which subsequently lead to a block breakage if the value reaches beyond six. Accordingly, a macro block address (MBA) interval within a transmission frame as recommended by CCITT recommendation H.261 is increased in accordance with the increase of the block number of the reception data in response to occurrences of burst errors in the reception image data in the transmission line. If the MBA interval is increased, a group of block start code (GBSC) interval as a starting point position of the group of block (GOB) maintaining an uniform interval is increased. If a spreading of a length of data packet occurs, a picture start code (PSC) interval as a starting point position of the image data for a visual display of an image on a screen is increased. At this time, the data error detector 20 connected to the entropy decoder 26, detects the error status of the reception image data if the frame interval changes rapidly by checking whether the MBA interval, the GBSC interval and the PSC interval are maintained at the uniform interval in order to correct errors associated with a previous frame as well as a current frame. When the data error detector 20 detects the error status in the reception image data, the data error detector 20 outputs the FUD-R signal to the controller 22. The controller 22, at this time, scans an input port by a prescribed period in step 50 of FIG. 2 and searches for the FUD-R signal in step 52. When the data error detector 20 generates the FUD-R signal requesting a transmission image recovery, the controller 22 detects the FUD-R signal in step 52 and outputs expect BAS code data to the multiplexer 36 in step 54. The expected BAS code data is in a form of binary data of "0101 0001" which represents the protocol data for requesting the transmission of the image data in an intraframe mode in order to compel an image recovery. The multiplexer 36 which receives the BAS code data of "0101 0001" output from the controller 22, multiplexes the BCH coded data and the BAS code data in accordance with CCITT recommendation H.221 and generates the multiplexed image data to the network interface 40. The BAS code data provided from the controller 22 of the receiving party is transmitted to the transmitting party which transmits the image data in accordance with CCITT recommendation H.221. The BAS code data transmitted from the receiving party is input to the de-multiplexer 38 through the network interface 40 within the motion video telephone of the transmitting party, and at this time, the motion video telephone of the transmitting party is operated as follows.

The de-multiplexer 38 of the motion video telephone of the transmitting party de-multiplexes the image data received through the network interface 40 and outputs the demultiplexed image data and the BAS control data separately. The image data is then input to the R-BCH decoder 34 and the BAS data is input to the controller 22. The controller 22 responsive to the de-multiplexer 38, determines whether the image data transmitted by the receiving party is received in step 56 of FIG. 3, and then detects whether the reception image data contains the expected BAS code data. That is, the controller 22 detects whether the received BAS code data is in a binary state of "0101 0001". If the received BAS code data is in a binary state of "0101 0001," the controller 22 judges that the FUD-R signal has been transmitted from the motion video telephone of the receiving party, and outputs the FUD-ACK signal to the data error detector 20 in step 60. That is, the controller 22 sets the transmission mode of the image data from an interframe mode (i.e., macro-block transmission) to an intraframe mode so that the image signal of one frame unit may be transmitted. The data error detector 20 generates a mode signal indicative of the intraframe mode (IT) to the DPCM 14 in response to the FUD-ACK signal. The DPCM 14 outputs the image data in the intraframe mode, namely the image data of ninety-nine macro block in one frame, to the entropy coder 24 in response to the mode signal indicative of an intraframe mode (IT) provided from the data error detector 20. If the DPCM 14 of the transmitting party outputs the image data in the intraframe mode as described above, the receiving party receives an accurate reproduction of an image.

In accordance with the preferred embodiment of the present invention, the error status of the reception data is detected by simply checking whether the MBA interval, the GBSC interval and the PSC interval in the reception image data are maintained at certain uniform intervals. Thus, it will be understood by persons skilled in the art that image data is available to be detected even with the concrete data amount of the receiving buffer 30 using the above-mentioned characteristics. That is, if the detection of the image data amount within the receiving buffer 30 is rapidly increased according to the entropy decoding operation by the error data of the entropy decoder 26, the error status of the reception data may be detected by similar means without departing from the spirit and scope of the present invention. Similarly, the image recovery scheme of the present invention can also be incorporated into the video and audio multiplex transmission system as disclosed by Hinman '350, Baker et al. '209 and Dangi et al. '492.

In the present invention as described above, the motion video telephone system is now capable of communicating audio and image information more effectively and smoothly through the ISDN network. Most significantly, accurate image reproduction is assured because data errors associated with the burst error occurring in the network are automatically detected and a broken image is automatically recovered when an image fast update request signal is automatically transmitted to the motion video telephone to enable the transmission of image data in an intraframe mode.

What is claimed is:

1. An image recovery apparatus in a video telephone system having image input-output means for providing an image signal and for enabling a visual display of a received image signal, said image recovery apparatus comprising:

image compression coder means for coding the image signal, and alternatively for decoding received coded image data;

entropy means for compressing, coding and outputting entropy coded data in dependence upon reception of the image data provided from said image compression coder means, and alternatively for decoding, expanding, and providing entropy decoded data to said image compression coder means;

network interface means for multiplexing said entropy coded data and control data to produce multiplexed data to a transmission line, and alternatively for de-multiplexing received multiplexed data from said transmission line to produce de-multiplexed data to said entropy means and to simultaneously extract and output coded data from the received multiplexed data;

controller means connected to said network interface means, for providing said control data to said network interface means in response to reception of a fast up-date request signal, and alternatively for producing a fast up-date request acknowledge signal in response to reception of said output coded data extracted from said received multiplexed data; and error detector means connected to said entropy means, for generating the fast up-date request signal to said controller means when a checked frame interval of said de-multiplexed data received from said network interface means exceeds a frame interval of an expected length of a frame after checking header data contained in said de-multiplexed data, and alternatively for setting a transmission mode of said image compression coder means in response to reception of said fast update request acknowledge signal provided from said controller means.

2. The image recovery apparatus of claim 1, further comprised of said error detector means setting the transmission mode of said image compression coder means from an interframe mode for transmitting only difference images between frames of said image data to an intraframe mode for transmitting an image of each frame in response to reception of said fast up-date request acknowledge signal.

3. The image recovery apparatus of claim 1, wherein said entropy means comprises:

transmission coder means for runlength coding the image data provided from said image compression coder means, coding runlength-coded data with a Bose-Chaudhuri-Hocquenghem code and outputting said entropy coded data; and reception decoder means for decoding said coded data with said Bose-Chaudhuri-Hocquenghem code, runlength decoding Bose-Chaudhuri-Hocquenghem decoded data, and outputting said entropy decoded data to said image compression coder means.

4. The image recovery apparatus of claim 3, wherein said transmission coder means comprises:

first coder means for providing runlength-coded data by runlength coding the image data provided from said image compression coding means;

buffer means for providing buffered data by buffering said runlength-coded data; and second coder means for providing said entropy coded data by coding said buffered data with a Bose-Chaudhuri-Hocquenghem code.

5. The image recovery apparatus of claim 3, wherein said reception decoder means comprises:

first decoder means for providing said Bose-Chaudhuri-Hocquenghem decoded data by decoding said de-multiplexed data received from said network interface means with a Bose-Chaudhuri-Hocquenghem code;

buffer means for providing buffered data by buffering said Bose-Chaudhuri-Hocquenghem decoded data; and second decoder means for providing said entropy decoded data to said image compression coder means by runlength decoding said buffered data.

6. The image recovery apparatus of claim 4, further comprised of said error detector means detecting errors contained in said demultiplexed received from said network interface means by making a comparison between a first interval representing a length of a data block in the runlength decoding of said Bose-Chaudhuri-Hocquenghem decoded data and a predetermined interval so as to produce the fast up-date request signal to said controller means.

7. The image recovery apparatus of claim 4, further comprised of said error detector means detecting errors contained in said demultiplexed data received from said network interface means by making a comparison between a first interval representing a length of a group of data blocks in the runlength decoding of said Bose-Chaudhuri-Hocquenghem decoded data and a predetermined interval so as to produce the fast update request signal to said controller means.

8. The image recovery apparatus of claim 6, further comprised of said error detector means making a comparison between a second interval representing a length of a group of data blocks by the increase of said first interval representing a length of said data block in the runlength decoding of said Bose-Chaudhuri-Hocquenghem decoded data with said predetermined interval so as to produce said fast up-date request signal to said controller means.

9. The image recovery apparatus of claim 1, further comprised of said error detector means detecting a sudden surge of data indicating that errors are contained in said de-multiplexed data received from said network interface means so as to produce said fast up-date request signal to said controller means.

10. The image recovery apparatus of claim 5, further comprised of said error detector means detecting a sudden surge of data indicating that errors are contained in said de-multiplexed data received from said network interface means within said buffer means so as to produce said fast up-date request signal to said controller means.

11. An image recovery apparatus in a video telephone system, comprising:

a transmitter for transmitting an image signal from a first subscriber to a second subscriber via a communication channel, said image signal being transmitted initially in an intraframe transmission mode for a first frame and subsequently in an interframe transmission mode for successive frames subsequent to said first frame via said communication channel, said interframe transmission mode representing transmission of only difference images between frames of said image data, and said intraframe transmission mode representing transmission of an image of each frame;

a receiver for receiving a reply image signal from said second subscriber via said communication channel;

an error detector for detecting errors contained in said reply image signal by checking whether a first interval representing a length of a data block of said reply image signal corresponds to a first predetermined interval, and alternatively for enabling said transmitter to transmit said image signal to said second subscriber in said intraframe transmission mode;

said transmitter comprising an encoder for providing an encoded image signal by encoding said image signal, and a multiplexer for providing a multiplexed image signal by multiplexing said image signal;

said receiver comprising a demultiplexer for providing a demultiplexed image signal by demultiplexing said reply image signal received via said communication channel and for separating a control signal representing an image recovery request by said second subscriber when errors are detected in said image signal received by said second subscriber from said reply image signal, and a decoder for providing a decoded image signal by decoding said demultiplexed image signal; and a controller responsive to said error detector, for alternatively controlling operations of said multiplexer and said demultiplexer, and for controlling said error detector to cause said transmitter to transmit said image signal in said intraframe transmission mode for one frame unit in response to said control signal.

12. The image recovery apparatus of claim 11, further comprised of said encoder encoding said image signal from said first subscriber with a runlength coding and a Bose-Chaudhuri-Hocquenghem coding, and said decoder decoding said reply image signal from said second subscriber with a runlength decoding and a Bose-Chaudhuri-Hocquenghem decoding.

13. The image recovery apparatus of claim 12, further comprising a first buffer for buffering a difference of said image signal from said first subscriber between the runlength coding and the Bose-Chaudhuri-Hocquenghem coding, and a second buffer for buffering a difference of said reply image signal from said second subscriber between the Bose-Chaudhuri-Hocquenghem decoding and the runlength decoding.

14. The image recovery apparatus of claim 13, further comprised of said error detector detecting errors contained in said reply image signal from said second subscriber via said communication channel by making a comparison between a second interval representing a length of a group of data blocks in the runlength decoding of said reply image signal and a second predetermined interval.

15. The image recovery apparatus of claim 13, further comprised of said error detector detecting errors contained in said reply image signal from said second subscriber via said communication channel when successive frame intervals of said reply image signal increase rapidly.

16. An image recovery method in a video telephone system for recovering a broken reproduced image, said image recovery method comprising the steps of receiving an image signal representing an image from a first subscriber to be transmitted to a second subscriber via a communication channel;

encoding said image signal and multiplexing an encoded image signal;

transmitting a multiplexed image signal via said communication channel, said multiplexed image signal being transmitted initially in an intraframe transmission mode for a first frame and subsequently in an interframe transmission mode for successive frames subsequent to said first frame via said communication channel, said interframe transmission mode representing transmission of only difference images between frames of said image data, and said intraframe transmission mode representing transmission of an image of each frame;

receiving a reply image signal from said second subscriber via said communication channel, demultiplexing said reply image signal for separating a control signal from said reply image signal and decoding a demultiplexed image signal, said control signal representing an image recovery request from said second subscriber when errors contained in said multiplexed image signal are detected from said second subscriber by checking whether a first interval representing a length of each data block of said multiplexed image signal corresponds to a first predetermined interval; and transmitting said multiplexed image signal via said communication channel in said intraframe transmission mode for one frame for an image recovery after switching said intraframe transmission mode to said intraframe transmission mode in response to said control signal.

17. The image recovery method of claim 16, further comprised of said encoding step encoding said image signal from said first subscriber with a runlength coding and a Bose-Chaudhuri-Hocquenghem coding, and said decoding step decoding said demultiplexed image signal from said second subscriber with a runlength decoding and a Bose-Chaudhuri-Hocquenghem decoding.

18. The image recovery method of claim 16, further comprised of said errors contained in said multiplexed image signal being detected by making a comparison between a second interval representing a length of a group of data blocks in the runlength decoding of said multiplexed image signal transmitted by said first subscriber and a second predetermined interval.

19. The image recovery apparatus as claimed in claim 16, further comprised of said errors contained in said multiplexed image signal being detected when successive frame intervals of said multiplexed image signal increase rapidly.

20. An image recovery method of a communication system comprising a first motion video telephone of a first subscriber and a second motion video telephone of a second subscriber, each motion video telephone including a transmitter for transmitting image data from the first subscriber to the second subscriber via a communication channel, a receiver for receiving reply data from said second subscriber via said communication channel, an error detector for detecting errors contained in said reply data to enable the motion video telephone of said second subscriber to transmit said reply data from an interframe transmission mode to an intraframe transmission mode, and a controller for controlling said error detector to generate a request signal requesting an image recovery from said second subscriber when said error detector detects errors contained in said reply data, and to alternatively enable transmission of said image data from said interframe transmission mode to said intraframe transmission mode in response to an acknowledge signal when errors are detected from said image data by said second subscriber, said image recovery method comprising:

an error detection information transmission step of said second motion video telephone of said second subscriber, for detecting the errors contained in the image data received from said first subscriber by checking whether a time interval of each data block of said image data corresponds to a predetermined interval, and multiplexing the request signal requesting an image recovery from said first subscriber with the reply data, and for transmitting multiplexed data from said second subscriber to said first subscriber via said communication channel; and an image information transmission step of said first motion video telephone of said first subscriber, for setting a data transmission mode from said intraframe transmission mode to said intraframe transmission mode in response to said request signal transmitted from said second subscriber, and for transmitting said image data in each frame image in said intraframe transmission mode from said first subscriber to said second subscriber.

21. A communication system, comprising:

a first communication terminal of a first subscriber comprising:

a transmitter for transmitting an image signal from said first subscriber to a second subscriber via a communication channel in an intraframe mode for a first frame and in an interframe mode for successive frames subsequent to said first frame;

a receiver for receiving a reply signal from said second subscriber via said communication channel;

a data error detector for detecting errors contained in the reply signal by checking whether a frame interval of the reply signal corresponds to a predetermined interval; and a controller for controlling the transmission of the image signal in the intraframe mode in dependence upon detection of errors contained in the image signal received by said second subscriber; and a second communication terminal of said second subscriber comprising:

a transmitter for transmitting the reply image from said second subscriber to said first subscriber via said communication channel in the intraframe mode for a first frame and in the interframe mode for successive frames subsequent to said first frame;

a receiver for receiving the image signal from said first subscriber via said communication channel;

a data error detector for detecting errors contained in the image signal by checking whether a frame interval of the image signal corresponds to said predetermined interval so as to enable the transmitter of said first subscriber to transmit the image signal to said second subscriber in the intraframe mode; and a controller for controlling the transmission of the reply signal to said first subscriber in the intraframe mode in dependence upon detection of errors contained in the reply image received by said first subscriber.

22. The communication system of claim 21, wherein the transmitter of said first subscriber comprises:

a first coder for generating a runlength-coded signal by runlength coding the image signal to be transmitted to said second subscriber;

a buffer for generating a buffered signal by buffering the runlength-coded signal; a second coder for generating an entropy coded signal by coding the buffered signal with a Bose-Chaudhuri-Hocquenghem code; and a multiplexer for generating a multiplexed signal representing said image signal to be transmitted to said second subscriber via said communication channel by multiplexing the entropy coded signal with an error code signal when the data error detector of said first subscriber detects the errors contained in the reply signal.

23. The communication system claim 21, wherein the transmitter of said second subscriber comprises:

a first coder for generating a runlength-coded signal by runlength coding the reply signal to be transmitted to said first subscriber;

a buffer for generating a buffered signal by buffering the runlength-coded signal; a second coder for generating an entropy coded signal by coding the buffered signal with a Bose-Chaudhuri-Hocquenghem code; and a multiplexer for generating a multiplexed signal representing said reply signal to be transmitted to said first subscriber via said communication channel by multiplexing the entropy coded signal with an error code signal when the data error detector of said second subscriber detects the errors contained in the image signal.

24. The communication system of claim 22, further comprised of said controller of said first communication terminal generating said error code signal to be multiplexed with the entropy coded signal prior to transmission to said second subscriber, when the data error detector of said first subscriber detects the errors contained in the reply signal.

25. The communication system of claim 23, further comprised of said controller of said second communication terminal generating said error code signal to be multiplexed with the entropy coded signal prior to transmission to said first subscriber, when the data error detector of said second subscriber detects the errors contained in the image signal.

* * * * *